(12) United States Patent
Snider et al.

(10) Patent No.: US 9,725,897 B2
(45) Date of Patent: Aug. 8, 2017

(54) OPEN AND CLOSED CELL POLYUREA FOAMS

(71) Applicant: JOHNS MANVILLE, Denver, CO (US)

(72) Inventors: Scott Snider, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 52 days.

(21) Appl. No.: 14/661,757

(22) Filed: Mar. 18, 2015

(65) Prior Publication Data

US 2016/0272774 A1    Sep. 22, 2016

(51) Int. Cl.
| | |
|---|---|
| *E04B 1/76* | (2006.01) |
| *C08J 9/00* | (2006.01) |
| *C08G 18/00* | (2006.01) |
| *E04B 2/56* | (2006.01) |
| *C08G 101/00* | (2006.01) |

(52) U.S. Cl.
CPC ............ *E04B 1/7604* (2013.01); *C08G 18/00* (2013.01); *C08J 9/0023* (2013.01); *C08G 2101/00* (2013.01); *C08J 9/0038* (2013.01); *C08J 2201/022* (2013.01); *C08J 2205/05* (2013.01); *C08J 2205/052* (2013.01); *C08J 2207/04* (2013.01); *C08J 2375/02* (2013.01)

(58) Field of Classification Search
CPC ......................................................... E04B 1/76
USPC .......................................................... 528/85
See application file for complete search history.

(56) References Cited

U.S. PATENT DOCUMENTS

| | | |
|---|---|---|
| 2004/0157945 A1 | 8/2004 | Barber |
| 2012/0202903 A1 | 8/2012 | Andrew et al. |

*Primary Examiner* — Duc Truong
(74) *Attorney, Agent, or Firm* — Robert D. Toulsee

(57) ABSTRACT

An open cell spray polyurea foam for use in an insulation layer in a wall structure may include a polyurea. The polyurea may be a reaction product of an isocyanate compound and water. The open spray polyurea foam may also include a filler. The majority of the filler may exist in the spray foam formulation as an unreacted first fire retardant. The spray foam formulation may further comprise a second fire retardant, and the insulation layer may exhibit a fire retardancy sufficient to pass Appendix X and/or ASTM E-84.

34 Claims, 6 Drawing Sheets

OPEN AND CLOSED CELL POLYUREA FOAMS

BACKGROUND

Spray foams are widely used as building insulation materials due to their excellent thermal insulation, fire resistance, and mechanical properties. The foams are commonly grouped as either "open cell" foams or "closed cell" foams depending on whether the cells in the foam are completely closed. Spray polyurethane foams (SPFs) made from polyurethane (PUR) are used in both open cell and closed cell foams, while spray isocyanurate foams are made from polyisocyanurate (PIR), which is normally used to make dense closed cell foams. Spray foam insulation is often formed as the polymerizing reactants are being sprayed directly into the building envelope to be insulated, usually with the help of a blowing agent.

Modern building codes require spray foams to pass fire tests such as the well-known ASTM E-84 test or the Appendix X test. These tests put strict limits on such characteristics as the flame spread and smoke development characteristics of a spray foam when the spray foam is exposed to fire. Passage of these tests is important for enabling widespread commercial use of a spray foam product. However, these tests are stringent, and fire retardants may be added to the foam formulation to improve the fire performance of a foam, or other measures may be taken to improve the fire retardancy of a foam. For example, intumescent coatings may be applied to SPFs, adding cost and complexity to the installation process.

BRIEF SUMMARY

According to a first aspect, an open cell spray polyurea foam for use in an insulation layer in a wall structure may include a polyurea. The polyurea may be a reaction product of an isocyanate compound and water. The open spray polyurea foam may also include a filler. The majority of the filler may exist in the spray foam formulation may be unreacted and may function as a first fire retardant. The filler may include a saccharide fire retardant. The insulation layer may exhibit a fire retardancy sufficient to pass Appendix X and/or ASTM E-84.

According to another aspect, a formulation for forming an open cell spray foam may include by weight 0-40 parts sucrose or ammonium polyphosphate (APP); 5-15 parts brominated diol, triol, or a combination of diol and triol; 2-10 parts other polyol; 15-25 parts tris(1-chloro-2-propyl) phosphate (TCPP); 0-2 parts diamine or polyamine; 4-10 parts amine catalyst; 5-15 parts emulsifier; 0.5-2 parts surfactant; and 15-25 parts water. A spray foam made from the spray foam formulation may exhibit a fire retardancy sufficient to pass Appendix X and/or ASTM E-84.

According to another aspect, an insulated structure may include a plurality of structural support members coupled together to form a frame and a plurality of first wall boards attached to an exterior side of the frame to form an exterior wall or surface of the structure. The plurality of structural support members and the plurality of wall boards may define a wall cavity of the structure. The insulated structure may also include a spray foam insulation positioned within the wall cavity of the structure. The spray foam insulation may include a spray foam made from a formulation that includes polyurea and a filler, where the majority of the filler in the spray foam formulation may be unreacted and may function as a first fire retardant. The formulation further may include a second fire retardant, and the insulation layer may exhibit a fire retardancy sufficient to pass Appendix X and/or ASTM E-84. The filler may be a sugar.

According to another aspect, a method of insulating a component of a building may include coupling a plurality of structural support members together to form a frame, attaching a plurality of first wall boards to an exterior side of the frame to form an exterior wall or surface of the structure, and attaching a plurality of second wall boards to an interior side of the frame to form an interior wall or surface of the structure. The structural support members, the first wall boards, and the second wall boards may define a plurality of wall cavities. The method may further include positioning a spray insulation material within at least one of the wall cavities of the structure to insulate an interior space of the structure. The spray insulation material may include a spray foam made from a spray foam formulation that may include polyurea and a filler. The majority of the filler may exist in the spray foam formulation as a non-reactive, first fire retardant. The spray foam formulation may further include a second fire retardant, and the insulation layer may exhibit a fire retardancy sufficient to pass Appendix X and/or ASTM E-84. The filler may be a sugar.

BRIEF DESCRIPTION OF THE DRAWINGS

The present technology is described in conjunction with the appended figures.

Figure 1:
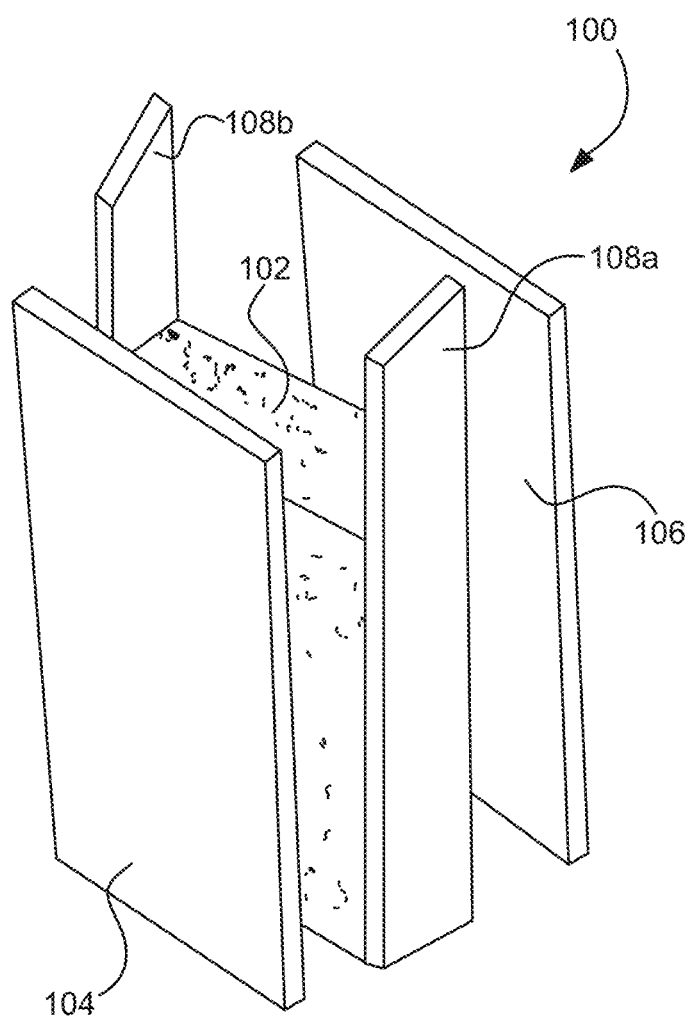
FIG. 1 illustrates an embodiment of a simplified exploded view of a spray foam insulation positioned within a wall cavity.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described include urea spray foam formulations that may include a fire retardant. The fire retardant may include a mono-, di-, oligo-, and/or polysaccharide polyol that acts primarily as a filler rather than as a reactive polyol. For example, the polyol may be a sugar. The fire retardant may react or may not react with isocyanate. The embodiments described herein may also provide a wall system that includes spray foam products made with the present spray foam formulations. The spray foam products may demonstrate passing fire performances in at least one of ASTM E-84, ASTM E1354, and Appendix X tests.

Many prior spray foams include polyurethane and are known as spray polyurethane foams (SPFs). A typical prior formulation for making SPF may include (i) a polyisocyanate reactant and (ii) a polyol reactant. The SPFs are made by combining separate liquid mixtures that include the polyisocyanates (the A-side mixture) and the polyols (the B-side mixture) and then immediately spraying the combined mixtures through a spray machine directly into a building envelope to be thermally insulated, such as a wall and joist cavity. The spray machine may include a first transfer pump for delivering the A component and a second transfer pump for delivering the B component. The A and B components are transferred at a prescribed volume ratio (often 1:1) through a heated dual hose into a spray gun, where the components mix together to form the SPF product that is released for administration at the building envelope. In some practices, the SPF product may be stored in and administered from a smaller, portable container that maintains the A-side and B-side mixtures in two separate pails or other containers until ready to combine and dispense. In other practices, the SPF liquids can be stored as a pre-combined and partially-reacted blend.

Exemplary Polyurea Foams

In contrast to SPFs, embodiments of the present technology may include a saccharide (e.g., sucrose or high fructose corn syrup) as a polyol, but the saccharide may not support the reaction of isocyanate compounds into polyurethane. Instead, the foams are polyurea foams.

Because saccharide molecules, and in particular sucrose (shown below), include multiple hydroxyl groups, saccharides have been explored as candidates for polyols to be used in foam formulations.

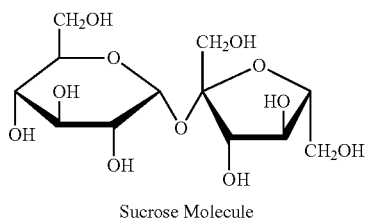

Sucrose Molecule

In this specification, saccharides describe compounds that include monosaccharides, disaccharides, oligosaccharides, and polysaccharides. Saccharides may include sugars. Sucrose-based foam formulations according to embodiments of the invention may result in good quality spray foams having a fine cell structure and good insulating values. Analysis of the resulting foam revealed that the sucrose was overwhelmingly present as an unreacted filler, and that the foam included little polyurethane. Instead, the foam may largely be polyurea foam rather than polyurethane foam. The foam may include a weight ratio of polyurea to polyurethane of greater than 70:30, greater than 80:20, greater than 90:10, or greater than 95:5 in embodiments. Foams that are predominantly polyurea may be formed from a B-side formulation with less than 15 wt. %, less than 10 wt. %, or less than 5 wt. % of a reactive polyol according to embodiments.

The presence of the sucrose primarily as an unreacted filler was confirmed by water extraction experiments, in which up to 82-92 percent of the sucrose provided in the B-side formulation used in making the foam was extractable from the resulting foam. According to embodiments, at least 80 weight percent of the sucrose or saccharide may exist in the open cell spray polyurea foam as an unreacted filler. In these or other embodiments, at least 80 weight percent of any mixture of fire retardants may exist in the open cell spray polyurea foam as unreacted fillers.

Sugar, such as sucrose, is known to be a fire retardant, due to its fast char formation and dehydration when exposed to fire. The presence of free sugar in the polyurea foam thus also contributes to a high degree of fire retardancy of the foam, and polyurea spray foam having a saccharide polyol in combination with an additional fire retardant can pass the ASTM E-84 test and/or the Appendix X test.

The A-side mixture of the spray foam may include one or more polyisocyanate compounds. Exemplary polyisocyanates may include substituted or unsubstituted polyisocyanates, and may more specifically include aromatic, aliphatic, and cycloaliphatic polyisocyanates having at least two isocyanate functional groups. Specific exemplary aromatic polyisocyanates include 4,4'-diphenylmethane diisocyanate (MDI), polymeric MDI (PMDI), toluene disisocyanate, and allophanate modified isocyanate. A commercial example of a PMDI that may be used in the present formulations is Rubinate® M manufactured by Huntsman Polyurethanes of The Woodlands, Tex. This PMDI has a viscosity range of about 200 to about 300 cps at 25° C. (e.g., 190 cps at 25° C.), a functionality range of about 2.3 to about 3.0, and an isocyanate content that ranges from about 28% and about 35% (e.g., 31%).

In addition, a spray foam according to embodiments of the invention may include one or more catalysts, may include one or more blowing agents, may include one or more surfactants, and may include other components. Depending on the specific combination of components, a spray foam formulation according to embodiments of the invention may produce a closed cell foam or an open cell foam.

In particular, a spray foam according to embodiments of the invention may include water as both a blowing agent and as a reactant to support the formulation of polyurea. For example, isocyanates and water can react to form a carbamic acid intermediate. This acid may quickly decompose by splitting off carbon dioxide and leaving behind an amine. The amine then reacts with another isocyanate group to form the polyurea linkage. The carbon dioxide liberated in this reaction can serve as an additional or the primary blowing agent.

Exemplary Fire Retardants

In order to further enhance their fire performance, spray foam formulations according to embodiments of the invention may include a second fire retardant, in addition to the first fire retardant in the formulation.

Other fire retardant fillers that may be used in place or in addition to sugar may include partially soluble and insoluble fillers. In these and other embodiments, ammonium polyphosphate or melamine may be used as an insoluble, fire retardant filler. Spray foams may include a mixture of any fire retardant fillers described herein. Spray foams may also include a mixture of soluble fillers, insoluble fillers, soluble and insoluble fillers, sucrose and ammonium polyphosphate, and sucrose and melamine.

In addition to, or in place of, a saccharide fire retardant, spray foams may include a non-saccharide fire retardant. The non-saccharide fire retardant included in a spray foam according to embodiments of the invention may be of any suitable type, for example a non-halogentated fire retardant or a halogentated fire retardant. The non-saccharide fire retardant may be reactive (containing isocyanate reactive functionality) or the non-saccharide fire retardant may be non-reactive. The non-saccharide fire retardant may be water soluble or water insoluble. The non-saccharide fire retardant may include ammonium polyphosphate.

Exemplary non-halogenated fire retardants may include organo-phosphate compounds, organo-phosphite compounds, and organo-phosphonate compounds. The organo-phosphate compounds can have the general formula:

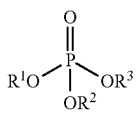

Organo-Phosphate Compounds where $R^1$, $R^2$ and $R^3$ are independently an alkyl group, an olefin group, a hydroxy alkyl group, or an aromatic group. Exemplary organo-phosphate compounds include butyl diphenyl phosphate, dibutyl phenyl phosphate, triphenyl phosphate, and triethyl phosphate (TEP), among other organo-phosphate compounds.

The organo-phosphite compounds can have the general formula:

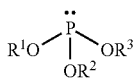

Organo-Phosphite Compounds where $R^1$, $R^2$ and $R^3$ are independently an alkyl group, an olefin group, a hydroxy alkyl group, or an aromatic group. Exemplary organo-phosphite compounds include tris(2,4-di-t-butylphenyl)phosphite.

The organo-phosphonate compounds can have the general formula:

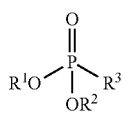

Organo-Phosphonate Compounds where $R^1$, $R^2$ and $R^3$ are independently an alkyl group, an olefin group, a hydroxy alkyl group, or an aromatic group. Exemplary organo-phosphonate compounds include diethyl hydroxylmethyl phosphonate (DEHMP), dialkyl hydroxyalkanephosphonate (e.g., dimethyl hydroxymethylphosphonate), and diaryl hydroxyalkanephosphonate (e.g., diphenyl hydroxymethylphosphonate) among other organo-phosphonate compounds.

Exemplary spray foam formulations may include the use of one of more of the above classes of phosphorous-containing, non-halogenated fire retardants. For example, the spray foam formulation may include an organo-phosphate compound, an organo-phosphite compound, or an organo-phosphonate compound. Additional examples include a combination of an organo-phosphate compound and organo-phosphite compound, a combination of an organo-phosphate compound and organo-phosphonate compound, or a combination of an organo-phosphite compound and organo-phosphonate compound. Further examples include combinations of an organo-phosphate compound, an organo-phosphite compound, and an organo-phosphonate compound.

In other embodiments, example spray foam formulations may include one or more halogenated fire retardants, for example tris(1-chloro-2-propyl)phosphate (TCPP), brominated diol, brominated triol, chlorinated phosphate, other halogenated fire retardants, or combinations thereof. In still other embodiments, a combination of halogenated and non-halogenated fire retardants may be used, in addition to or in place of the saccharide. Halogenated fire retardants may include halogenated polyols.

Exemplary Spray Foam Insulation Systems

Referring now to FIG. 1, an insulation is shown with spray foam insulation 102 positioned between a first wall board 104 and second wall board 106 attached to structural support members 108. The spray foam insulation 102 may include open cell foam insulation, closed cell foam insulation, or a combination of both open and closed cell foam insulation.

Open cell foam insulations embodying the invention may be characterized by a lower density in a range from about 0.3-1.8 pcf or pounds per cubic foot, while closed cell foam insulations embodying the invention include intermediate to higher density at a range from about 1.75-8.0 pcf. For example, open cell foam insulation may have a density from about 0.3-0.7 pcf (e.g., about 0.5 pcf), and closed cell foam insulation may have a density from about 1.8-4.0 pcf. In embodiments, an open cell foam insulation may have a density from about 0.7-1.5 pcf. The open cell spray foam insulation may have a tensile strength between about 3 psi and about 10 psi. An open cell foam may have a closed cell content of less than 10%.

Both open and closed cell foam insulations have high insulation value, or R-value, and thus offer high resistance to heat flow. The selection of open or closed cell foam insulation may be based on several factors, including, for example, insulating power, air and moisture permeability, strength, rigidity, water resistance, density, acoustic absorption levels, and the like.

Still referring to FIG. 1, the spray foam insulation 102 is fire resistant and passes the ASTM E-84 and/or Appendix X fire tests, due in part to the presence of a sugar that acts as a fire retardant and exists in the spray foam formulation primarily as an unreacted filler, and to the presence of an additional fire retardant, for example one of the fire retardants described above. The ASTM E-84 tunnel test is a common fire test that is required for plastic foam insulation used in either wall or roof insulation systems. The test requires measuring the flame spread and smoke density that is generated by the foam core in response to exposure to a flame. Most polyurethane spray foams can only pass this test by using halogenated fire retardants. The halogenated fire retardants enable the insulation to pass this test due to the fire retardants' dual function of gas phase radical scavenging and char formation in the solid phase.

Appendix X is a common fire test for spray foam insulation. The test procedure is a modified NFPA 286, "Standard Methods of Fire Tests for Evaluating Contribution of Wall and Ceiling Interior Finish to Room Fire Growth," method. A passing test is when the time for attainment of the four measured test parameters is 4 minutes 18 seconds or greater. The four parameters are the time at which flames exit the doorway, the Heat Release Rate exceeds 1 MW, the heat flux to the floor exceeds 20 kW/m², and the average upper layer temperature exceeds 600° C. Most spray foams can only pass this test by covering the spray foam layer with an intumescent coating, which incurs additional costs and labor during installation.

Test results show that the spray foam insulation 102 that includes sugar primarily as an unreacted filler in combination with an additional fire retardant pass the ASTM E-84 and/or Appendix X test in part due to the char formation and dehydration attributable to the sugar filler.

Turning back to FIG. 1, the spray foam insulation 102 includes a sugar, the majority of which is present in the spray foam formulation as an unreacted filler and acts as a fire retardant. The spray foam insulation 102 also includes an additional fire retardant, and passes the ASTM E-84 and Appendix X fire tests. For instance, an exemplary open cell spray foam formulation may include a combination of components and parts listed below in Table 1 or Table 2. The sum of the parts by weight in Table 1 or Table 2 may or may not equal 100. An open cell spray foam formulation may also include a combination of sucrose and ammonium polyphosphate.

TABLE 1

Example open cell spray foam formulation.

| Component | Parts by Weight |
| --- | --- |
| Sucrose | 0-40 |
| Brominated diol, triol, or combination of diol and triol | 5-15 |
| Other polyol | 2-10 |
| tris(1-chloro-2-propyl)phosphate (TCPP) | 15-25 |
| Aromatic or aliphatic di- or polyamine | 0-2 |
| Amine catalyst(s) | 4-10 |
| Emulsifier | 5-15 |
| Surfactant | 0.5-2 |
| Water | 15-25 |

TABLE 2

Example open cell spray foam formulation.

| Component | Parts by Weight |
| --- | --- |
| Ammonium polyphosphate (APP) | 0-40 |
| Brominated diol, triol, or combination of diol and triol | 5-15 |
| Other polyol | 2-10 |
| tris(1-chloro-2-propyl)phosphate (TCPP) | 15-25 |
| Aromatic or aliphatic di- or polyamine | 0-2 |
| Amine catalyst(s) | 4-10 |
| Emulsifier | 5-15 |
| Surfactant | 0.5-2 |
| Water | 15-25 |

The spray foam insulation 102 shown in FIG. 1 is functioning as insulation material for a wall system. The spray foam insulation 102 typically have insulative R-values of 3.0 to 4.5 per inch for open cell foams and insulative R-values of 5.8 to 7.0 per inch for closed-cell foams.

An amine catalyst may include a tertiary amine, treiethylenediamine (TEDA), N-methylimidazole, 1,2-dimethylimidazole, N-methylmorpholine, N-ethylmorpholine, triethylamine, N,N'-dimethyl-piperazine, 1,3,5-tris(dimethylaminopropyl)hexahydrotriazine, 2,4,6-tris(dimethylamino-methyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylamino-cyclohexylamine, pentamethyldipropylenetriamine, triethanolamine, dimethylethanolamine, bis(dimethylaminoethyl)ether, tris(3-dimethylamino)propylamine, 1,8-diazabicyclo[5.4.0]undecene, bis(N,N-dimethylaminopropyl)-N'-methyl amine and their acid blocked derivatives, and mixtures thereof.

Emulsifiers may include nonylphenolethoxylates (NPEs), oxyethylated fatty alkyl phenols (NPEs), oxyethylated fatty alcohols (alkylethoxylated alcohols), foam stabilizing agents such as silicone polyethers, among other conventional additives and agents. An emulsifier may include NP-9. Amine catalysts and emulsifiers are described in U.S. Patent Publication No. 2012/0202903, which is incorporated herein by reference for all purposes.

Surfactants may reduce surface tension during foaming and may affect the cell structure of the foam. Surfactants may include a silicone surfactant, an organic surfactant, a silicone polyether copolymer, silicone-polyoxyalkylene block copolymers, nonionic polyoxyalkylene glycols and their derivatives, ionic organic salts, ether sulfates, fatty alcohol sulfates, sarcosinates, amine oxides, sulfonates, amides, sulf-succinates, sulfonic acids, alkanol amides, ethoxylated fatty alcohol, and nonionics such as polyalkoxylated sorbitan. Example surfactants may include polydimethylsiloxane-polyoxyalkylene block copolymers. Other surfactants are described in European Patent Application No. EP1578832, which is incorporated herein by reference for all purposes.

Exemplary Wall Systems

Wall structures or systems of commercial and residential structures are commonly insulated by filling a wall cavity that is positioned between wall studs (wood or metal). The wall cavity may be filled using a spray foam insulation (open cell and/or closed cell, such as the spray foam insulation 102) or in combination with a Batt or roll insulation (e.g., fiberglass, mineral wool, cotton, and the like), loose fill insulation (e.g., fiberglass, cellulose, mineral wool, and the like). Thermal bridging from the wall studs can reduce the effectiveness of the cavity insulation. To reduce the effects of thermal bridging, the wall system or structure may include external sheathing insulation (e.g., continuous external sheathing), such as with a foil faced rigid foam board, that is coupled with the cavity insulation.

Figure 2:
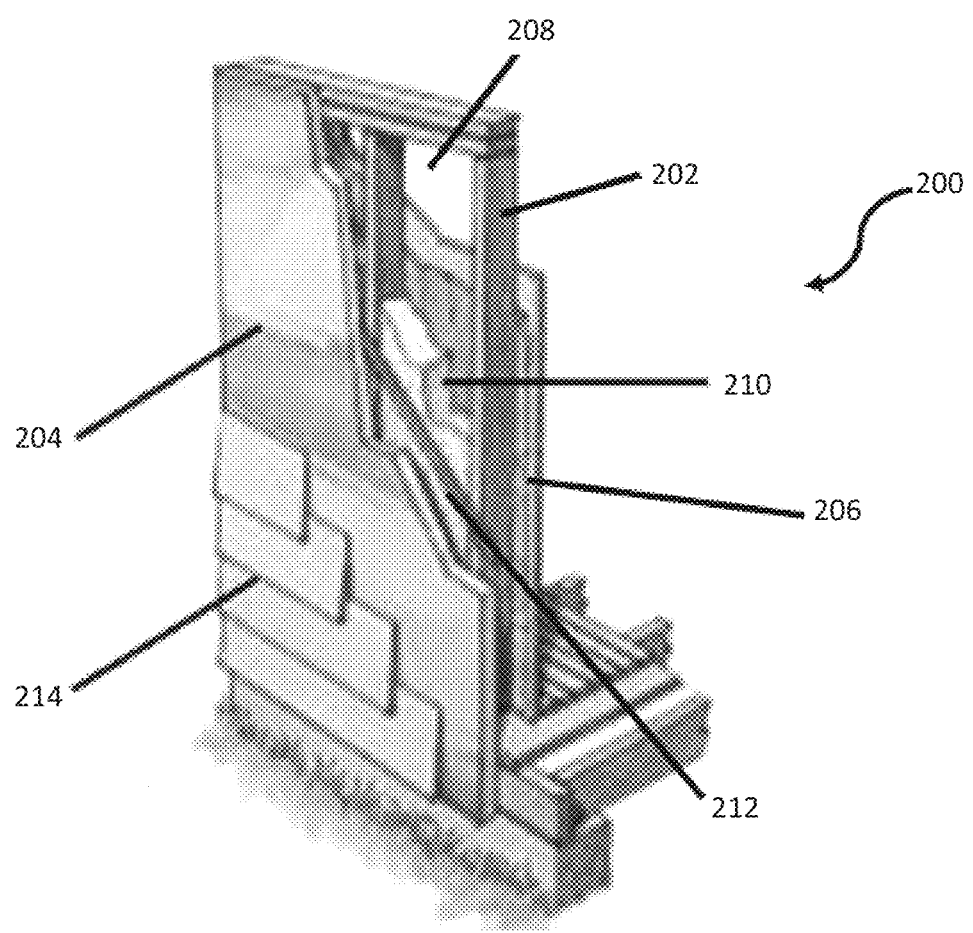
FIG. 2 illustrates an embodiment of a commercial or residential wall system or structure that includes a spray foam insulation positioned inside a wall cavity.

Referring now to FIG. 2, illustrated is an embodiment of a wall system or structure 200 that may be used to insulate a commercial or residential structure. Wall system 200 includes a plurality of structural support members or wall studs 202 that are coupled together to form a wall frame. A plurality of foam boards, particle boards, and/or plywood boards 204 (hereinafter sheathing boards 204) are attached to an exterior side of the frame to form an insulative exterior wall or surface of the wall system 200 (i.e., continuous external sheathing insulation). A plurality of wall boards 206 are attached to an interior side of the frame opposite the sheathing boards 204 to form an interior wall or surface of the wall system 200. Exemplary wall boards 206 include gypsum boards and the like. The wall studs 202, sheathing boards 204, and wall boards 206 define a plurality of wall cavities 208.

Fasteners (not shown) are used to attach the sheathing boards 204 and wall boards 206 to the respective sides of the frame. Each fastener may include an elongate shaft that penetrates through a respective board and into a wall stud 202 to couple the components together. Exemplary fasteners include nails and screws, although in some embodiments non-mechanical fasteners may be used, such as adhesives and the like. Spray foam insulation 210 is positioned within at least one of the wall cavities 208 of the wall system, and more commonly within each wall cavity 208 or within most of the wall cavities. The spray foam insulation 210 is positioned within the wall cavity 208 to insulate the building or structure.

In some embodiments, an additional wall board 212 may be attached to the exterior side of the frame. The additional wall board 212 may be a gypsum board, cement board, oriented strand board (OSB), plywood, and the like. Wall board 212 may be positioned between the sheathing board 202 and frame or wall studs 202 for structural support and/or other purposes. External veneer or cladding 214 (hereinafter exterior cladding 214) may be positioned on an exterior side of the sheathing boards 204. In some embodiments, the exterior cladding 214 may be free of a halogenated fire retardant. The exterior cladding 214 may include brick, stucco, rock, siding, paneling, and the like that provides the structure with an aesthetic appeal while optionally also providing one or more desired mechanical or other characteristics. In some embodiments, a drainage cavity or barrier may be positioned between one or more of the components of the wall system, such as between the exterior cladding 214 and the sheathing boards 204. The wall system 200 may also include other components, layers, and/or materials that are not shown, such as an interior vapor barrier, flashing, primer, and the like.

In some embodiments, the sheathing board 204 may also include a foil facer that is attached to an exterior side of the board. The sheathing boards 204 may comprise foam and have a foam density of between about 1.5 and 2.5 pcf, and more commonly between about 1.6 and 2.0 pcf. In some embodiments, the sheathing board also includes between 1 and 10 weight percent of a blowing agent, such as a hydrocarbon blowing agent. In other embodiments, the sheathing board includes between about 5 and 8 weight percent of the blowing agent.

Figure 3:
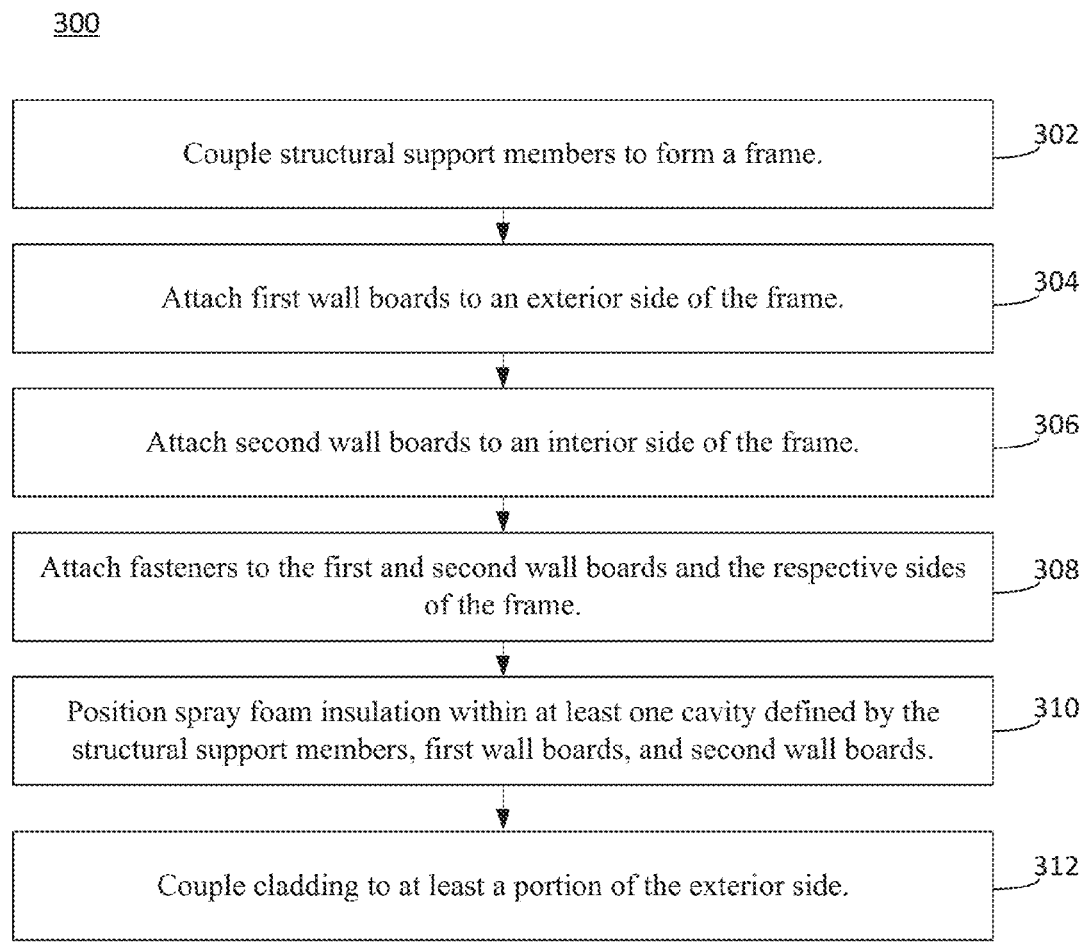
FIG. 3 illustrates a method for insulating a component of a building with the present spray foam insulation according to embodiments.

Turning now to FIG. 3, an insulation method 300 for insulating a component of a building with spray foam insulation is provided. The method 300 may include coupling 302 a plurality of structural support members together to form a frame. The structural support members may include wall studs as shown in FIG. 2. The method 300 may further include the step of attaching 304 a plurality of first wall boards, such as foam boards or sheathing boards, to an exterior side of the frame to form an exterior wall or surface of the structure. Further, the method 300 may include attaching 306 a plurality of second wall boards to an interior side of the frame to form an interior wall or surface of the structure. In this way, the method 300 provides for a plurality of wall cavities defined by the structural support members, the first wall boards, and the second wall boards. In some embodiments, the method further includes the step of attaching 308 a plurality of fasteners to the first and second wall boards and the respective sides of the frame to secure the building structure. As described previously, each fastener may comprise an elongate shaft that penetrates through a respective wall board and into a respective structural support member to couple the components together. Such fasteners may include nails and screws, non-mechanical fasteners, adhesives, and the like.

Still referring to FIG. 3, the method 300 further includes the step of positioning spray foam insulation within at least one of the wall cavities of the structure to insulate an interior space of the structure 310. The spray foam insulation is made from the present primarily polyurea spray foam formulations described above. Exemplary methods of positioning the spray foam insulation may include spraying the A-side and B-side components of the formulation into the wall cavity with the aid of a blowing agent. In the case of an open-cell spray foam insulation, the blowing agent may be water or an aqueous solution. In the case of a closed-cell spray foam insulation, the blowing agent may be a fluorocarbon gas (e.g., 245-fa, 365-mfc, HFO 1233zd) and/or a non-halogenated hydrocarbon (e.g., pentane).

In another aspect, the method 300 further includes the steps of coupling 312 cladding to at least a portion of the exterior wall. Fiberglass material may also be optionally positioned within at least one of the wall cavities.

EXAMPLES

Spray foams were made with an A-side formulation with 100 parts per weight of polymeric MDI. The A-side formulation was mixed with the B-side formulations shown in Table 3. The resulting spray foams were analyzed with Fourier Transform Infrared (FTIR) spectroscopy.

TABLE 3

B-side formulations.

| | Spray Foam Designation | | | | |
|---|---|---|---|---|---|
| | TST-NU (ppw) | TST-NU + sucrose (ppw) | TST-2 (ppw) | TST-2 no sucrose (ppw) | SST-68 (ppw) |
| Sucrose | | 28.0 | 28.0 | 0.0 | |
| Di-amine | 0.5 | 0.5 | | | 1.0 |
| Water | 20.0 | 20.0 | 20.0 | 20.0 | 22.0 |
| Brominated polyol | | | 6.0 | 6.0 | 8.0 |
| TCPP | 31.0 | 31.0 | 25.0 | 25.0 | 24.0 |
| Ammonium polyphosphate | | | | | 20.0 |
| Hydroxyl-containing amine catalysts | | | 8.0 | 8.0 | 7.5 |
| Reactive amine, amine catalyst | 2.0 | 2.0 | 2.0 | 2.0 | 2.0 |
| Non-reactive amine, amine catalyst | 6.0 | 6.0 | | | 0.5 |
| Silicone surfactant | 1.0 | 1.0 | 1.0 | 1.0 | 1.0 |
| Emulsifier | | | 10.0 | 10.0 | 14.0 |
| B-SIDE TOTAL | 60.5 | 88.5 | 100.0 | 72.0 | 100.0 |

Example 1

Spray foam TST-NU was made from a B-side formulation that includes no reactive hydroxyl groups. For example, the B-side formulation does not include any brominated polyol. As a result of not having any reactive hydroxyl groups, the spray foam that results cannot include urethane and should be a polyurea. As a comparison, spray foam TST-NU+sucrose has the same B-side formulation as TST-NU, except for the addition of 28 parts per weight sucrose.

Figure 4:
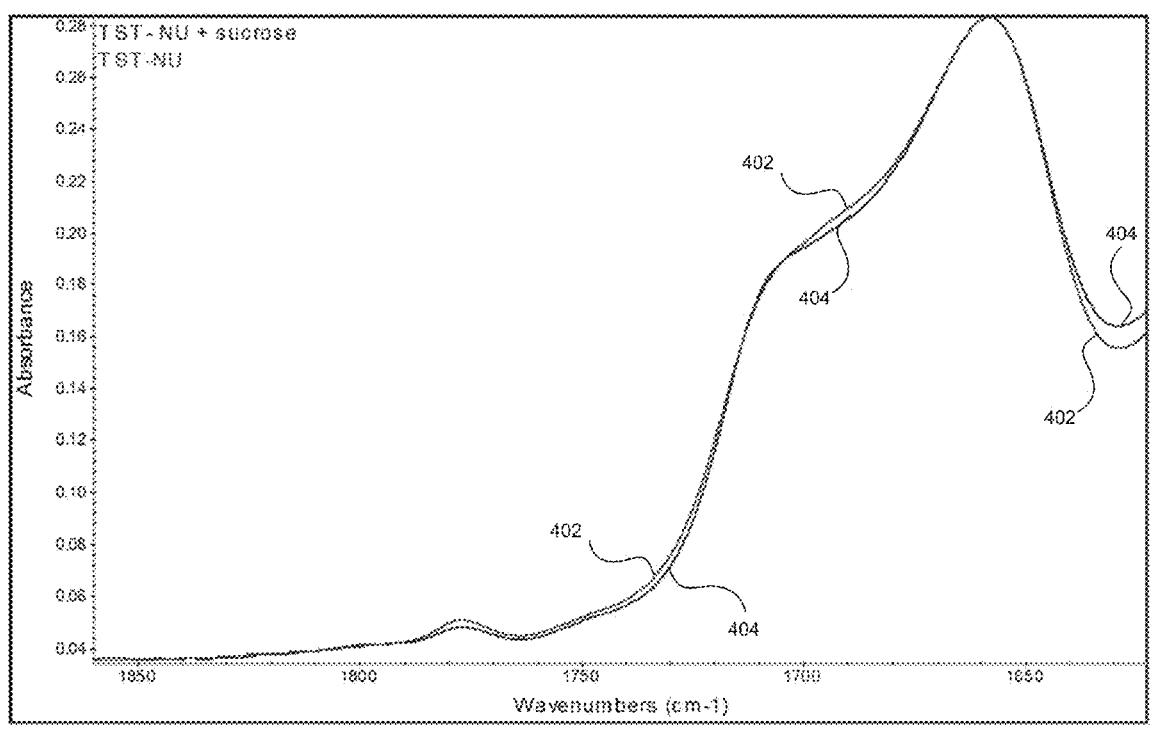
FIG. 4 shows FTIR spectra of two spray foams according to embodiments.

The resulting spray foams were analyzed with FTIR, as shown in FIG. 4. FIG. 4 shows wavenumbers in the urethane and urea region. The FTIR spectrum for TST-NU is denoted by line 402, while the FTIR spectrum for TST-NU+sucrose is denoted by line 404. As can be seen from FIG. 4, no significant difference was observed between the two spectra. As previously noted, TST-NU had no reactive hydroxyl groups and thus cannot react with polymeric MDI to form a urethane. As a result, the spectrum for TST-NU showed the presence of urea and not urethane. Because line 404 substantially overlaps with line 402, TST-NU+sucrose also does not show the presence of urethane groups. Based on these spectra, TST-NU+sucrose can be observed to be a polyurea foam and not a polyurethane foam, even though the B-side formulation included sucrose. The hydroxyl groups in sucrose did not appear to react with polymeric MDI.

Example 2

Figure 5:
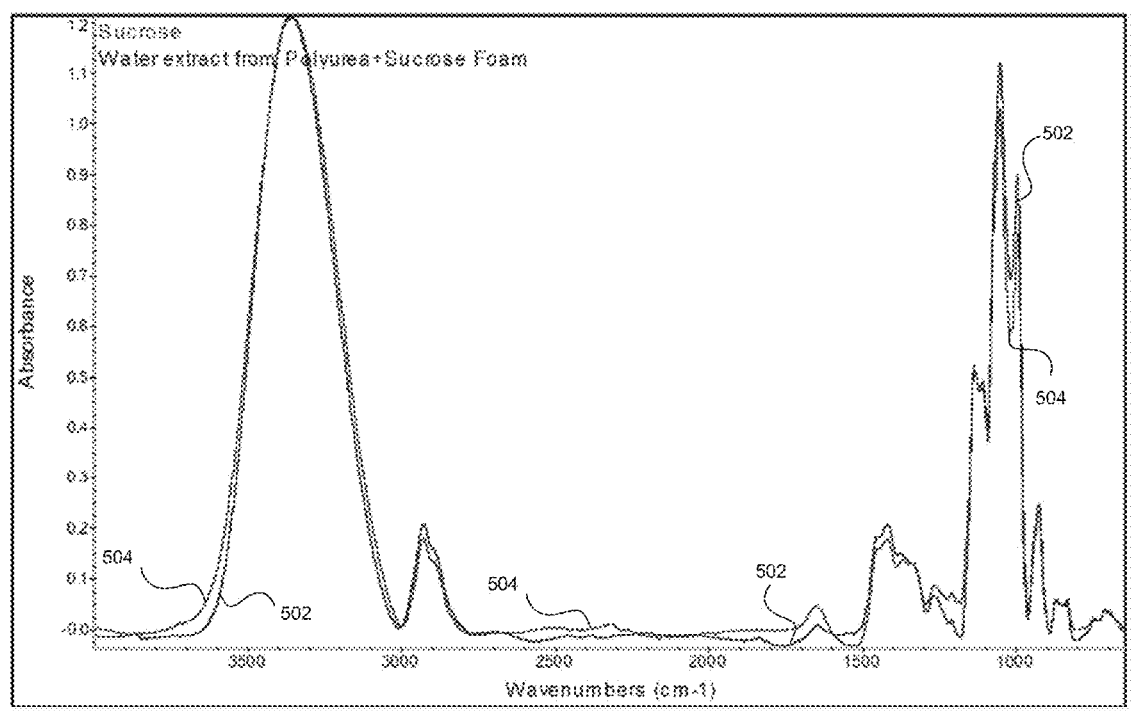
FIG. 5 shows FTIR spectra of a water extract from a foam and sucrose according to embodiments.

A polyurea foam was made from a B-side formulation containing sucrose, similar to TST-NU+sucrose. Foam was submerged in water to extract soluble and unbonded components from the foam. The water extract was analyzed in FTIR. Results for the water extract FTIR are shown in FIG. 5 as line 502. As a control, sucrose was analyzed by FTIR. The sucrose spectrum is shown as line 504. Line 502 and line 504 show significant overlap. The spectra indicated that the water extract from the polyurea foam contains sucrose. Because water was able to extract sucrose from the polyurea foam, sucrose was shown to not be bonded to polyurea.

Example 3

Spray foam TST-2 was made from a B-side formulation containing a brominated polyol and hydroxyl-containing reactive catalysts. A brominated polyol has hydroxyl groups that will react with polymeric MDI and form a polyurethane. TST-2 includes 6 parts brominated polyol along with 28 parts sucrose and 20 parts water in 100 parts of the B-side formulation. Based on the amount of brominated polyol, the TST-2 foam would be unlikely to contain only polyurethane. As a comparison, spray foam TST-2 no sucrose was made from a B-side formulation identical to the B-side formulation for TST-2 except that no sucrose was included. TST-2 and TST-2 no sucrose films were analyzed by FTIR, and the resulting spectra are shown in FIG. 6.

Figure 6:
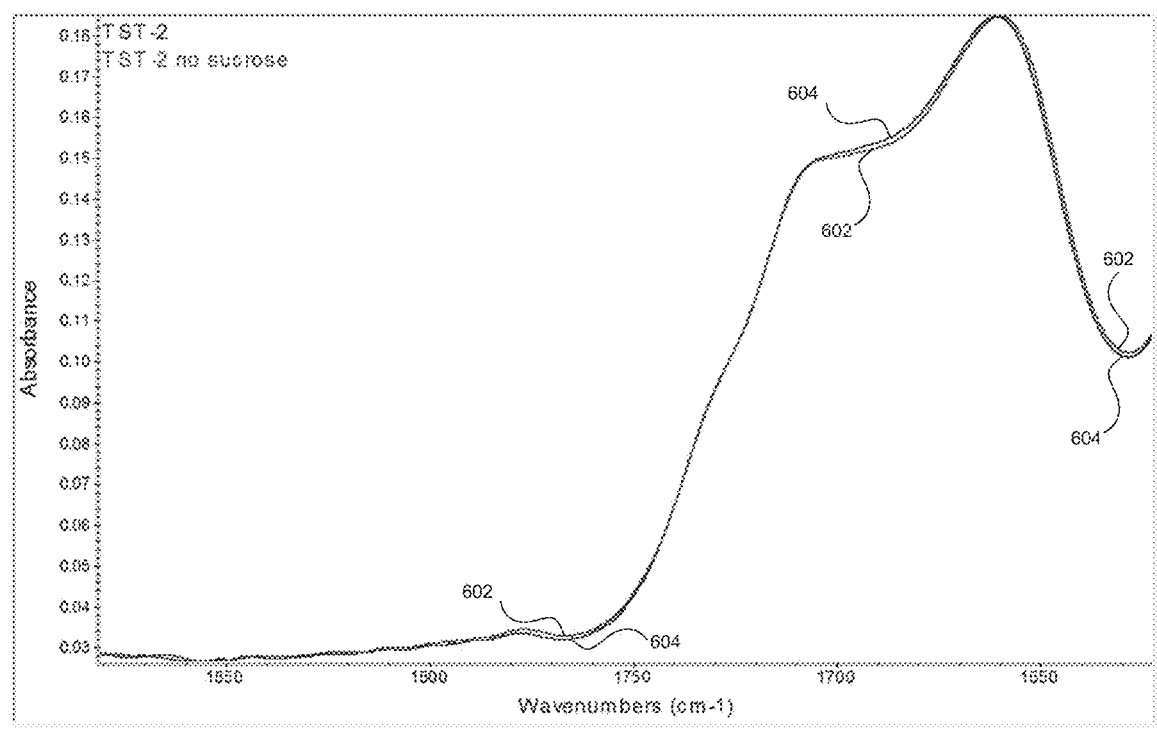
FIG. 6 shows FTIR spectra of two spray foams according to embodiments.

FIG. 6 shows wavenumbers in the urethane and urea region. The FTIR spectrum for TST-2 no sucrose is denoted by line 602, and the FTIR spectrum for TST-2 is denoted by line 604. As can be seen from FIG. 6, no significant difference was observed between the two spectra. Whatever urethane groups and urea groups TST-2 foam had, the spectra of the groups were unaffected by the removal of sucrose in TST-2 no sucrose foam. Based on this example and FIG. 6, removing sucrose from a formulation was not observed to affect the urethane range of the FTIR spectrum. The hydroxyl groups in sucrose did not appear to react with polymeric MDI.

Example 4

Spray foam SST-68 was formed with a B-side formulation that included 20 parts ammonium polyphosphate (APP) and no parts sucrose. The B-side formulation also included 8 parts brominated polyol and 7.5 parts hydroxyl-containing amine catalysts. The brominated polyol is likely reactive with polymeric MDI, and as such, the foam likely includes urethane along with urea groups. The resulting SST-68 foam improved fire retardancy and flame test performance over an open cell polyurethane foam.

The description above provides exemplary embodiments, and is not intended to limit the scope, applicability or configuration of the disclosure. Rather, the description of the exemplary embodiments provides those skilled in the art with an enabling description for implementing one or more exemplary embodiments. It is understood that various changes may be made in the function and arrangement of elements without departing from the spirit and scope of the invention as set forth in the appended claims. For example, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the system" includes reference to one or more systems and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The description and/or claims herein may use relative terms in describing features and/or aspects of the embodiments. For example, the description and/or claims may use terms such as relatively, about, substantially, approximately, and the like. These relative terms are meant to account for deviations that may be appreciated or accepted in the art. For example, the description and/or claims may describe the wall or roof system being substantially free of halogen. Such a description implies that each or most of the wall system components is free of a halogen fire retardant while recognizing that some of the components may include a very small and/or negligible amount of halogen. Likewise, the disclosure herein may describe the components of the wall or roof system being substantially continuous. Such a description implies that the components may be assembly and/or attached so that a layer of the component or material is essentially continuous while recognizing that some interruptions from a fully continuous surface or layer, or other minor irregularities, may be present. The relative terms used herein may account for deviations from uniform that may appreciated and/or accepted by those skilled in the art. These deviations may be up to about 10%, but are typically less than 5% and often less than about 3%.

What is claimed is:

1. An open cell spray polyurea foam for use in an insulation layer in a wall structure, the open cell spray polyurea foam comprising:
    a polyurea, wherein the polyurea is a reaction product of an isocyanate compound and water; and
    a fire retardant, wherein the fire retardant does not react with the isocyanate compound.

2. The open cell spray polyurea foam of claim 1, wherein the fire retardant is a first fire retardant, and the open cell spray polyurea foam further comprises a second fire retardant.

3. The open cell spray polyurea foam of claim 1, wherein the fire retardant is a first fire retardant, and the open cell spray polyurea foam further comprises a second fire retardant, wherein the second fire retardant reacts with the isocyanate compound.

4. The open cell spray polyurea foam of claim 3, wherein the second fire retardant is a halogenated polyol.

5. The open cell spray polyurea foam of claim 1, wherein the fire retardant is water soluble and does not react with isocyanate.

6. The open cell spray polyurea foam of claim 5, wherein the fire retardant is a saccharide.

7. The open cell spray polyurea foam of claim 5, wherein the fire retardant is sucrose.

8. The open cell spray polyurea foam of claim 7, wherein in at least 80 weight percent of the sucrose exists in the open cell spray polyurea foam as an unreacted filler.

9. The open cell spray polyurea foam of claim 2, wherein at least 80 weight percent of the first fire retardant and 80 weight percent of the second fire retardant exist in the open cell spray polyurea foams as unreacted fillers.

10. The open cell spray polyurea foam of claim 5, wherein the fire retardant is high fructose corn syrup.

11. The open cell spray polyurea foam of claim 1, wherein the fire retardant is insoluble in water and does not react with isocyanate.

12. The open cell spray polyurea foam of claim 11, wherein the fire retardant is ammonium polyphosphate.

13. The open cell spray polyurea foam of claim 11, wherein the fire retardant is melamine.

14. The open cell spray polyurea foam of claim 1, wherein:
the fire retardant is a first fire retardant, and
the first fire retardant is water soluble and does not react with isocyanate, and
further comprising a second fire retardant, wherein the second fire retardant is insoluble in water and does not react with isocyanate.

15. The open cell spray polyurea foam of claim 1, wherein the insulation layer exhibits a fire retardancy sufficient to pass a flame test in accordance with ASTM E-84.

16. The open cell spray polyurea foam of claim 1, wherein the insulation layer has an insulative R value of 3.0 to 5.0 per inch and a density of between about 0.3 to about 0.7 pcf.

17. The open cell spray polyurea foam of claim 1, wherein the insulation layer has a density of between about 0.7 to about 1.5 pcf.

18. The open cell spray polyurea foam of claim 6, further comprising a non-halogenated fire retardant.

19. The open cell spray polyurea foam of claim 6, further comprising a halogenated fire retardant.

20. The open cell spray polyurea foam of claim 19, wherein the halogenated fire retardant is tris(1-chloro-2-propyl)phosphate.

21. The open cell spray polyurea foam of claim 19, wherein the halogenated fire retardant comprises at least one of a brominated diol, a brominated triol, and chlorinated phosphate.

22. The open cell spray polyurea foam of claim 6, wherein the fire retardant is a first fire retardant, and
further comprising a second fire retardant, wherein the second fire retardant comprises an organo phosphorous compound.

23. The open cell spray polyurea foam of claim 22, wherein the organo phosphorous compound is selected from the group consisting of an organo-phosphate, an organo-phosphite, and an organo-phosphonate.

24. The open cell spray polyurea foam of claim 22, wherein the organo phosphorous compound comprises triethyl phosphate.

25. The open cell spray polyurea foam of claim 22, wherein the second fire retardant comprises a blend of butyl diphenyl phosphate, dibutyl phenyl phosphate, and triphenyl phosphate.

26. The open cell spray polyurea foam of claim 22, wherein the organo phosphorous compound comprises diethyl hydroylmethyl phosphonate.

27. The open cell spray polyurea foam of claim 1, further comprising a catalyst.

28. The open cell spray polyurea foam of claim 1, wherein the open cell spray polyurea foam has a tensile strength is between about 3 psi and about 10 psi, and the open cell spray polyurea foam has a closed cell content is less than 10%.

29. An insulated structure, comprising:
a plurality of structural support members coupled together to form a frame;
a plurality of wall boards attached to an exterior side of the frame to form an exterior wall or surface of the structure, wherein the plurality of structural support members and the plurality of wall boards define a wall cavity of the structure; and
a spray foam insulation positioned within the wall cavity of the structure, the spray foam insulation comprising a spray foam made from a formulation that comprises:
polyurea, wherein the polyurea is a reaction product of an isocyanate compound and water,
a first fire retardant, wherein a majority of the first fire retardant exists in the spray foam insulation as an unreacted filler and the first fire retardant does not react with the isocyanate compound, and
a second fire retardant,
wherein the spray foam is an open cell spray foam.

30. The insulated structure of claim 29, wherein the spray foam has an insulative R-value from 3.0 to 5.0 per inch and a density of between about 0.3 pcf and about 0.7 pcf.

31. A method of insulating a component of a building, comprising:
coupling a plurality of structural support members together to form a frame;
attaching a plurality of first wall boards to an exterior side of the frame to form an exterior wall or surface of the structure;
attaching a plurality of second wall boards to an interior side of the frame to form an interior wall or surface of the structure, wherein the structural support members, the first wall boards, and the second wall boards define a plurality of wall cavities; and
positioning a spray insulation material within at least one of the wall cavities of the structure to insulate an interior space of the structure, wherein the spray insulation material comprises a spray foam made from a spray foam formulation that comprises:
polyurea, wherein the polyurea is a reaction product of an isocyanate compound and water;
a first fire retardant, wherein a majority of the first fire retardant exists in the spray foam formulation as an unreacted filler and the first fire retardant does not react with the isocyanate compound; and
a second fire retardant;

wherein the spray foam comprises an open cell spray foam.

32. The method of insulating a structure of claim 31, wherein the spray foam has an insulative R value of 3.0 to 5.0 per inch and a density of between about 0.3 to about 0.7 pcf.

33. The insulated structure of claim 29, wherein the insulation layer exhibits a fire retardancy sufficient to pass a flame test in accordance with ASTM E-84.

34. The method of insulating a structure of claim 31, wherein the insulation layer exhibits a fire retardancy sufficient to pass a flame test in accordance with ASTM E-84.

* * * * *